Patented Dec. 3, 1940

2,223,693

UNITED STATES PATENT OFFICE 2,223,693

THIOACETALSULPHONIC ACIDS AND A PROCESS OF MAKING SAME

Henry Martin and Rudolf Hirt, Basel, Switzerland, assignors to the firm J. R. Geigy S. A., Basel, Switzerland No Drawing. Application November 15, 1937, Serial No. 174,734. In Switzerland November 25, 1936

12 Claims. (Cl. 260—505)

We have found that new, water-soluble thioacetalsulphonic acids can be obtained by condensing compounds, which contain a reactive carbonyl group beside one or more sulphonic acid groups and eventually any other substituents, with substituted or unsubstituted, equal or different aliphatic, araliphatic, hydroaromatic, aromatic and heterocyclic mercaptans. As carbonyl compounds there may be the best used aldehyde- or ketosulphonic acids or likely reacting bodies.

The possibility of obtaining the new compounds under ordinary conditions of condensation could not be foreseen. It is true that a number of not sulphonated thioacetals has been obtained by reaction of mercaptans on ketones and aldehydes in presence of acid condensing agents. This reaction, however, takes place plainly or smoothly with simple monoaldehydes and monoketones only. With substituted aldehydes and ketones, on the contrary, the reaction power wholly depends on the nature and position of the substituents and on the used mercaptans. Thus, ketocarboxylic acids and nitrosoketones mostly react plainly, aminoketones, alkyl-substituted ketones and diketones or unsaturated ketones, however, only difficultly or not at all (see B. Ber. 27, 1041, 32, 1240, 1801, 33, 2983, 34, 2643, 35, 493, 799). On the other hand the different mercaptans show a very different behaviour with respect to the same aldehydes and ketones. In this respect it may be noted that the reactivity with the phenylmercaptans often is considerably diminished (see B. Ber. 34, 2643). Further it must be mentioned that certain of these known thioacetals tend to decomposition under regeneration of the starting materials.

Under these conditions, the condensation of mercaptans, especially halogenated benzyl- and phenyl-mercaptans with reactive carbonylsulphonic acids, particularly ketone- and aldehyde sulphonic acids, appeared to be very improbable. Likewise the answer to the question whether such condensation products would for example be stable in water or not, was uncertain.

It was, therefore, surprising to observe that the condensation of mercaptans with aldehyde- and ketonesulphonic acids succeeds in a very nice manner. It is mostly advantageous to assist or favor the progress of the reaction by means of suitable condensing agents.

The present process thus allows to obtain new, mostly stable, water-soluble condensation products which with suitable substitution for example are strongly effective for the protection of wool, feathers, hairs, furs and the like against moths and like pests of the insect class, as the goods prepared with said products have become unfit for consumption by the pests and thus are prevented from being attacked thereby. Other ones of these new compounds are usable as textile assistants for wetting, softening, finishing, etc. purposes, or as intermediate products in the manufacture of dyestuffs.

The following examples illustrate the invention, the parts being by weight, where it is question of parts:

Example 1

23.5 parts of the sodium salt of benzaldehyde-o-sulphonic acid of 88.5 per cent strength are dissolved in 100 parts of glacial acetic acid and mixed with 22 parts of thiophenol. Dry hydrochloric acid gas is then introduced into the mixture up to saturation, the reaction mixture is allowed to stand in a closed vessel for about 6 hours and then poured into 500 parts of a saturated common salt solution. The condensation product separated in form of a heavy oil is isolated, repeatedly washed with ether, some water and a diluted caustic soda lye. The sodium salt is a transparent oil easily soluble in water, which slowly solidifies with the time.

In a similar manner benzyl-, dodecyl-, cetyl-, furfurylmercaptan and so on can be condensed with benzaldehyde-o-sulphonic acid.

Example 2

10.4 parts of pure sodium benzaldehyde-o-sulphonate are dissolved warm in about 30 parts of glacial acetic acid and after cooling mixed with 14.5 parts of 4-chloro-thiophenol. After having introduced thereinto during half an hour a vigorous hydrochloric acid stream, whereby the temperature temporarily rises to 60° C., the mixture is poured into water. The solution is then rendered approximately neutral and the unaltered 4-chloro-thiophenol distilled off by steam. By concentration and addition of common salt to the warm solution, there is separated the p-chlorophenylmercaptal of the benzaldehyde-o-sulphonic acid in form of a white precipitate. The latter is soluble in ether and acetone, insoluble in benzene, more difficultly soluble in cold water and more easily soluble in warm water.

By the use of condensing agents, such as $ZnCl_2$, $AlCl_3$, $SnCl_4$, $POCl_3$, dilute $H_2SO_4$ etc., the formation of the new mercaptal is favorably affected.

In a similar manner 4-bromo- or -fluoro-thiophenol, 3-chloro-thiophenol, 2-chloro- or 2-nitrothiophenol, 2:4- or 3:4-dichloro-thiophenol, 2- or 4-chloro- or 2-oxybenzylmercaptan, 3-chloro-4-methyl- or 4-ethoxybenzylmercaptan, 3:4- or 2:6-dichlorobenzylmercaptan, chloro- or dichlorobenzylmercaptan, made by chlorination of benzylchloride at 30–40° C. with iodine as catalyst, and so on can be condensed with benzaldehyde-o-sulphonic acid. Instead of the o-compound there can also be used the benzaldehyde-m- or -p-sulphonic acid or other substitution products such as 2-chlorobenzaldehyde-5-sulphonic acid etc.

Example 3

11 parts of sodium acetophenone-p-sulphonate and 15 parts of 4-chlorothiophenol are dissolved warm in 180 parts of acetic acid of 85 per cent strength, after cooling saturated with hydrochloric acid gas and allowed to stand for 15 hours at ordinary temperature. Then the reaction mixture is poured into 400 parts of a saturated common salt solution and the precipitate exhausted by suction. After drying the new thioacetal compound can, if necessary, be extracted with benzene for purposes of purification.

*Determination of chlorine.*—$C_{20}H_{15}O_3S_3Cl_2Na$, calculated: 14.4% Cl, found: 14.7% Cl.

Instead of the 4-chloro-thiophenol, other mercaptans can be used, thus for example 2-chlorobenzylmercaptan, 2-methyl-3-chloro-thiophenol etc. (see Examples 1 and 2). The acetophenone-p-sulphonic acid can also be replaced by benzyl-acetonesulphonic acid made by smooth sulphonation of benzylacetone.

Example 4

15.5 parts of sodium benzaldehyde-disulphonate are dissolved hot in glacial acetic acid and some water and mixed with 14.5 parts of p-chlorothiophenol. Thereupon, condensation is performed by means of hydrochloric acid gas during 4 hours and the whole is allowed to stand during 24 hours. According to Example 1 the disodium salt of the 4-chlorophenylmercaptal of the benzaldehyde-disulphonic acid can then be separated by means of a common salt solution. The same is soluble in water and alcohol, insoluble in benzene.

Instead of the benzaldehyde-disulphonic acid there can also be used acetaldehyde-disulphonic acid; on the other hand, the p-chlorothiophenol can be replaced by other halogenthiophenols or halogenbenzyl-mercaptans.

Example 5

1 molecule of sodium benzaldehyde-o-sulphonate is dissolved with 1 molecule of benzylmercaptan or 4-chlorobenzylmercaptan in glacial acetic acid and allowed to stand for some hours. Thereupon the whole is mixed with 1 molecule of 4-chloro-thiophenol and saturated with gaseous hydrochloric acid. The mixed condensation product is then worked up as described in Example 1. The obtained p-chlorophenyl-(chloro)benzyl-mercaptal of the benzaldehyde-o-sulphonic acid is in form of the sodium salt easily soluble in warm water.

Example 6

10.4 parts of sodium benzaldehyde-o-sulphonate are dissolved in 40 parts of glacial acetic acid and mixed with 6.3 parts of benzylmercaptan. The mixture is allowed to stand for 12 hours, then 10 parts of dodecylmercaptan are added thereto and condensation is performed with hydrochloric acid gas to yield the dodecyl-benzylmercaptal of the benzaldehyde-o-sulphonic acid. The acetic acid solution is poured into water, whereby the new compound is separated in form of an oil. The same solidifies by cooling with ice to a thick paste which is clearly soluble in water.

What we claim is:

1. A process for the production of thioacetal-sulphonic acids, consisting in causing one molecule of a compound containing a reactive carbonyl group selected from the group of aliphatic and aromatic carbonylsulphonic acids of the benzene series to react with about two molecules of a mercaptan selected from the group of aliphatic, araliphatic, aromatic and heterocyclic mercaptans.

2. A process for the production of thioacetal-sulphonic acids, consisting in causing one molecule of a benzaldehyde sulphonic acid to react with about two molecules of a mercaptan selected from the group of aliphatic, araliphatic, aromatic and heterocyclic mercaptans.

3. A process for the production of thioacetal-sulphonic acids, consisting in causing one molecule of a benzaldehyde sulphonic acid with about two molecules of a mercaptan containing a benzene nucleus.

4. A process for the production of thioacetal-sulphonic acids, consisting in causing one molecule of a benzaldehyde sulphonic acid with about two molecules of a halogenated benzylmercaptan.

5. A process for the production of thioacetal-sulphonic acids, consisting in causing one molecule of benzaldehyde-o-sulphonic acid with about two molecules of a halogenated benzylmercaptan.

6. A process for the production of thioacetal-sulphonic acids, consisting in causing one molecule of benzaldehyde-o-sulphonic acid with about two molecules of 4-chlorobenzylmercaptan.

7. As new products, the thioacetalsulphonic acids of the formula

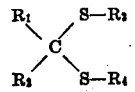

$R_1$ being a member of the group consisting of H and $CH_3$, $R_2$ being a sulphonated radical of the group consisting of araliphatic and aromatic radicals of the benzene series, $R_3$ and $R_4$ being radicals selected from the group consisting of higher aliphatic, araliphatic, heterocyclic and benzenoid radicals, said products being colorless to slightly colored compounds, soluble in water, forming soluble alkali salts and being capable of moth-proofing animal fibres.

8. As new products, the thioacetalsulphonic acids of the formula

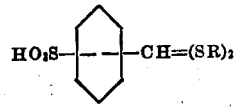

R being radicals selected from the group of higher aliphatic, araliphatic, heterocyclic and benzenoid radicals, said products being colorless to slightly colored compounds, soluble in water, forming soluble alkali salts and being capable of moth-proofing animal fibres.

9. As new products, the thioacetalsulphonic acids of the formula

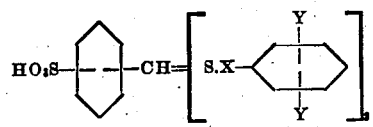

X being a member of the group consisting of H and $CH_2$, Y being members of the group consisting of H and halogen, said products being colorless to slightly colored compounds, soluble in water, forming soluble alkali salts and being capable of moth-proofing animal fibres.

10. As new products, the thioacetalsulphonic acids of the formula

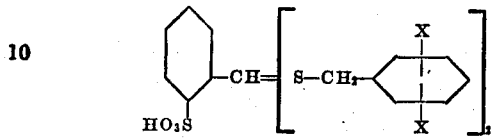

X being members of the group consisting of H and chlorine, being colorless to slightly colored compounds, soluble in water, forming soluble alkali salts and being capable of moth-proofing animal fibres.

11. As new product, the thioacetalsulphonic acid of the formula

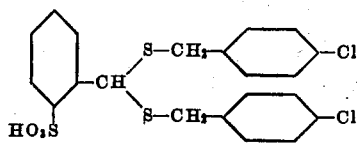

being a colorless compound soluble in water, forming soluble alkali salts and being capable of moth-proofing animal fibres.

12. Moth-proofing compositions containing as their essential active ingredient a water soluble thioacetalsulphonic acid of the formula

$R_1$ being a member of the group consisting of H and $CH_3$, $R_2$ being a sulphonated phenyl radical, and $R_3$ and $R_4$ being radicals selected from the group consisting of higher aliphatic, araliphatic, heterocyclic and aromatic radicals of the benzene series, said compositions being colorless to slightly colored compounds, forming soluble alkali salts and being capable of moth proofing animal fibres from an aqueous bath.

HENRY MARTIN.
RUDOLF HIRT.